United States Patent [19]

Wadiak

[11] Patent Number: 5,224,286
[45] Date of Patent: Jul. 6, 1993

[54] CRAB HAND LINE

[76] Inventor: Richard Wadiak, 4147 Tampico Trail, Hernando Beach, Fla. 34607

[21] Appl. No.: 944,529

[22] Filed: Sep. 14, 1992

[51] Int. Cl.$^5$ ............................................. A01K 97/00
[52] U.S. Cl. ..................................... 43/42.7; 43/43.1
[58] Field of Search ............... 43/42.7, 43.1, 54.1, 43/55; 224/103; D22/149, 134; 24/3 D

[56] References Cited

U.S. PATENT DOCUMENTS

| | | | |
|---|---|---|---|
| 2,565,163 | 8/1951 | Ball | 43/43.1 |
| 2,959,333 | 11/1960 | Baggett | 224/103 |
| 3,335,472 | 8/1967 | Imai | 43/43.1 |
| 5,027,545 | 7/1991 | Lowrie et al. | 43/44.97 |
| 5,038,514 | 8/1991 | Yong-Set | 43/54.1 |

Primary Examiner—Mark Rosenbaum
Assistant Examiner—Jeanne M. Elpel
Attorney, Agent, or Firm—Stanley M. Miller

[57] ABSTRACT

A crab hand line device has a triangular configuration and is opened and closed in the general manner of a safety pin. An elongate rod is bent in three locations to form a short leg, a medium length leg, and a long leg of the triangular configuration. A first end of the rod is bent into a return bend that is normal to the plane of the device. A second bend in the rod is a gradual ninety degree bend, and the third bend is a gradual one hundred fifty degree bend so that a thirty-sixty-ninety degree triangle is formed. The free end of the long leg is pointed to that a bait item is easily impaled onto it, and the pointed free end is releasably engaged with the return bend after the bait has been impaled to ensure that the bait cannot fall off of the third leg. The device is weighted so that it will not float, and the streamlined contour of the triangular configuration ensures that it will not snag on plant material as it is raised to the surface when a crab is feeding on the bait.

5 Claims, 1 Drawing Sheet

CRAB HAND LINE

BACKGROUND OF THE INVENTION

1. Field of the Invention

This invention relates, generally, to devices for catching crabs. More particularly, it relates to an improved crab hand line of the type used by sports crabbers.

2. Description of the Prior Art

Nets and traps are the tools most often used by commercial crabbers to catch crabs. Typical crab traps are shown in U.S. Pat. Nos. 4,134,226 to Petrella, 4,416,082 to Strobel, and 4,177,601 to Morton. However, there is a large body of sport crabbers; the sports crabber is not interested in harvesting vast quantities of crabs over a short time period, but would prefer to catch a small number of crabs in a leisurely fashion. Thus, sports crabbers do not use the well known tools of commercial crabbers.

Crabs are voracious eaters and will seldom let go of food once they have begun feeding. Accordingly, sport crabbers have learned that a piece of bait can be tied to a line, known as a crab hand line, and lowered into a place where crabs are thought to be present. If a crab begins feeding on the bait, the sports crabber slowly raises the bait by pulling in the line without jerking it so as to avoid startling the crab, and captures the crab by scooping it up in a net once the crab is within about six inches of the surface of the water.

The known crab hand lines have a number of drawbacks. Unless the bait itself is heavy, the hand line will float on the surface and will be ineffective because crabs do not feed on the surface; however, if a heavy bait is used and a fish, crab, or other animal eats a large piece of it before the sports crabber begins pulling in the line, the bait will float to the surface and lose its effectiveness. Thus, there is a need for a crab hand line that does not float to the surface even when a light-in-weight bait is used.

The known hand lines also become snagged on crabgrass and other underwater plant material as the bait is pulled in. Thus, there is a need for a crab hand line that does not become snagged as it is pulled through crabgrass and the like.

Baiting the known crab hand lines is also problematic. A line tied around a chicken leg, for example, does not hold the leg very well. Thus, there is a need for an improved crab hand line that is easy to bait, yet which will hold the bait securely for as long as the crab hand line is in use. There is also a need for a bait holder that enables facile removal of leftover parts of the bait.

The prior art, when considered as a whole at the time the present invention was made, neither taught nor suggested to those of ordinary skill in the art of sports crabbing how an improved crab hand line could be built.

SUMMARY OF THE INVENTION

The longstanding but heretofore unfulfilled need for an improved crab hand line is now fulfilled. Three bends are formed in an elongate stainless steel rod to form a triangular-shaped bait holder that is locked into a closed, bait holding position in a manner reminiscent of a safety pin. In a preferred embodiment, the bait holder has the general appearance of a thirty-sixty-ninety degree triangle.

The first bend is formed in a first end of the elongate rod. It is a return bend that forms a catch means; the bend is formed normal to the plane of the bait holder. The second bend is a ninety degree bend, and the third bend is about one hundred fifty degrees so that the second end of the rod is engaged by the catch. Thus, the bait holder has three primary parts: the first part is the short leg of the triangle within which is formed the catch means, the second part is the base of the triangle, and the third part is the hypotenuse thereof having a free end that is positioned in engaged relation to the catch means when the bait is in place. The resiliency of the rod and its triangular shape enables the user to squeeze the hypotenuse or longest leg to disengage it from the catch in much the same manner as a safety pin is squeezed to disengage the pin means thereof from the catch means thereof. The bait is impaled on the longest leg when its free end is disengaged from the catch means and the free end is then engaged to the catch means in safety pin fashion. A weight is secured to the base leg of the triangular device, and a line is tied to the device at the third bend thereof, i.e., where the base leg and the longest leg meet.

The novel shape of the device enables it to slide freely through plant material. Just as importantly, it is easy to bait and easy to retrieve unused bait therefrom, but fish or crabs cannot remove the bait therefrom except by eating it. Moreover, the weight ensures that it will remain in its effective position for as long as it is in use.

Thus it is clear that the primary object of this invention is to provide an improved crab hand line that overcomes the shortcomings of earlier crab hand lines.

A more specific object is to provide a crab hand line that is easy to bait, easy to remove bait therefrom, which will not float, and which does not easily become snagged when passing through plant material.

These and other important objects, features, and advantages of the invention will become apparent as this description proceeds.

The invention accordingly comprises the combination of elements, arrangement of parts, and features of construction that will be set forth in the following detailed disclosure, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, within which.

DETAILED DESCRIPTION OF THE PREFERRED EMBODIMENT

Figure 2:
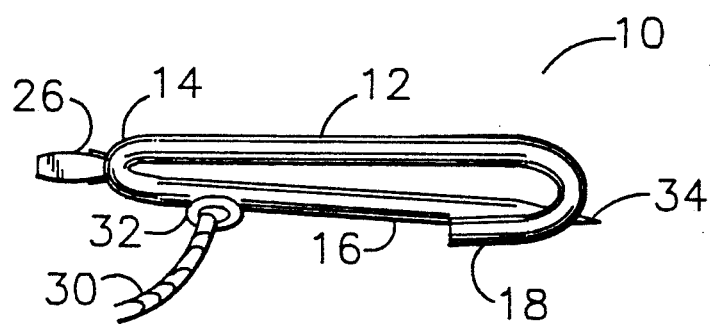
FIG. 2 is a top plan view thereof.

Referring now to the Figs., it will there be seen that an exemplary embodiment of the invention is denoted as a whole by the reference numeral 10. Crab hand line assembly 10 is made from an elongate rod of a suitable material such as stainless steel that is bent into a generally triangular configuration having a first leg, a second leg, and a third leg. More particularly, device 10 includes a short leg 12, a leg 14 of intermediate length, and a long leg 16. The first end of the rod is bent into a return bend to form a catch means 18; as shown in FIG. 2, the plane of the return bend is normal to the plane of the device 10 as a whole. A second bend, in spaced relation to said first bend, is a rounded ninety degree bend in the plane of the device and is denoted 20, and a third rounded bend, denoted 22, is in the plane of the device and is about one hundred fifty degrees so that the included angle 24 between second or base leg 14 and long leg 16 is about thirty degrees. Thus, the included angle between long leg 16 and short leg 12 is about sixty degrees.

A one ounce or other appropriate weight 26 is fixedly secured to base leg 14 by a suitable attachment means 28, and a line such as a mason cord 30 is secured to an eyelet member 32 that is mounted on the exterior side of the third bend as shown. In another embodiment of the invention, the eyelet is not employed; in that embodiment, line 30 is tied directly to device 10 at the location of the eyelet.

The second end of the rod, i.e., the free end of the long leg 16 is pointed as at 34; this facilitates impaling a bait by driving long leg 16 through it. The bait is impaled when the free end is detached from the catch means, and the bait is secured by reattaching the free end of the long leg to the catch means. The opening and closing of the catch means is accomplished in the same way as the opening and closing of a safety pin, i.e., base leg 14 and long leg 16 are squeezed to separate the free end of the long leg from the catch, and said free end is displaced in a direction away from the catch and normal to the plane of device 10 to free it; the procedure is reversed to secure the free end of said leg into the catch means. In this manner, the objective of providing an easily baitable device is achieved, as is the object of providing a means for easily removing a bait item.

The pointed end of the rod may be capped by a cork or other suitable, easily removable capping means 36 for the purpose of safety. The length of line 30 is whatever length the sports crabber prefers; a typical length is twenty feet.

Figure 1:
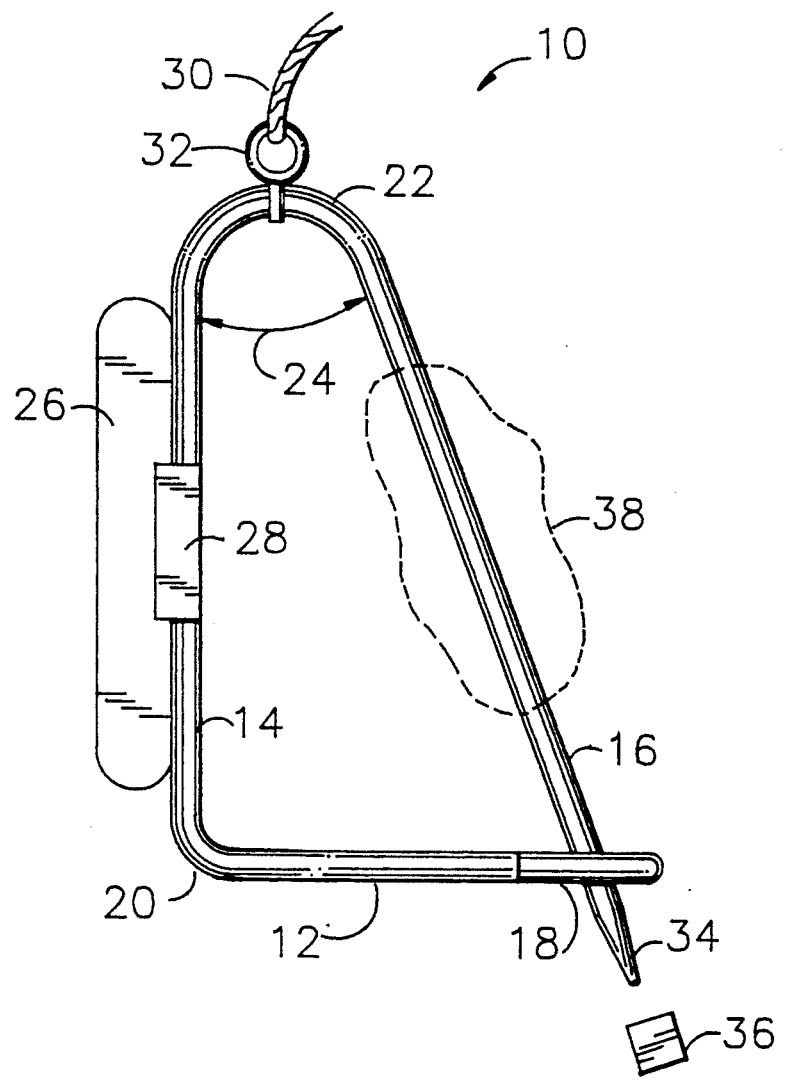
FIG. 1 is a side elevational view of an illustrative embodiment of the invention.

FIG. 1 depicts device 10 in the position it is in as it is being drawn toward the surface of the water when a crab is feeding on bait 38 impaled on long leg 16; note that the swept back contour of the device where the third bend 22 is formed enables the device to pass through plant material without snagging. This same effect could be achieved if the triangular shape of device 10 were that of an equilateral triangle, but the thirty-sixty-ninety degree shape is preferred because it lessens the distance between base leg 14 and long leg 16 and thus facilitates squeezing of the device when bait is being loaded or unloaded thereonto.

The Figs. show device 10 in approximately actual size, but the size thereof may be changed as desired.

This invention is clearly new and useful. Moreover, it was not obvious to those of ordinary skill in this art at the time it was made in view of the prior art as a whole.

It will thus be seen that the objects set forth above, and those made apparent from the foregoing description, are efficiently attained, and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A crab hand line device, comprising:
an elongate rod bent into a generally triangular shape;
said elongate rod having a first end and a second end;
said elongate rod, when bent into said triangular shape, having a first, a second, and a third leg;
said first end of said elongate rod having a return bend formed therein;
said return bend being formed normal to the plane of said crab hand line device and said return bend forming a catch means;
said elongate rod having a second bend formed therein in spaced apart relation to said return bend;
said elongate rod having a third bend formed therein, said second end of said elongate bar being a free end of said third leg;
said free end of said third leg being disposed in releasable engagement with said catch means;
a line means secured to said device at said third bend;
a weight means, said weight means being secured only to said second leg of said device;
whereby a bait item is impaled on said third leg when said free end is disengaged from said catch means and said free end is engaged with said catch means to maintain said bait item on said third leg.

2. The device of claim 1, wherein said free end of said third leg is pointed to facilitate said impaling of said bait item.

3. The device of claim 2, further comprising a capping means for capping said pointed free end.

4. The device of claim 1, further comprising an eyelet member secured to said device at said third bend to facilitate attachment of said line means to said device.

5. The device of claim 1, wherein said triangular shape is a thirty-sixty-ninety degree triangle, wherein said first leg is the short leg of said triangle, wherein said second leg is the base of said triangle, and wherein said third leg is the hypotenuse of said triangle.

* * * * *